United States Patent
Berminge et al.

(10) Patent No.: US 7,641,422 B2
(45) Date of Patent: Jan. 5, 2010

(54) CUTTING TOOL AND ASSOCIATED TOOL HEAD

(75) Inventors: Erik Berminge, Järbo (SE); Per Hansson, Gävle (SE)

(73) Assignee: Sandvik Intellectual Property AB, Sandviken (SE)

( * ) Notice: Subject to any disclaimer, the term of this patent is extended or adjusted under 35 U.S.C. 154(b) by 97 days.

(21) Appl. No.: 10/589,944

(22) PCT Filed: Feb. 22, 2005

(86) PCT No.: PCT/SE2005/000245

§ 371 (c)(1),
(2), (4) Date: May 1, 2007

(87) PCT Pub. No.: WO2005/084947

PCT Pub. Date: Sep. 15, 2005

(65) Prior Publication Data

US 2008/0038072 A1 Feb. 14, 2008

(30) Foreign Application Priority Data

Mar. 3, 2004 (SE) .................................. 0400544

(51) Int. Cl.
*B23B 27/10* (2006.01)
*B23B 27/04* (2006.01)
(52) U.S. Cl. .................. 407/11; 407/101; 407/117; 407/107; 407/91; 82/50; 408/56
(58) Field of Classification Search .................. 407/11, 407/91, 110, 50, 109, 107, 111, 113, 117; 82/50; 408/56; *B23B 27/10*
See application file for complete search history.

(56) References Cited

U.S. PATENT DOCUMENTS

| 3,323,195 | A | * | 6/1967 | Vanderjagt | 407/11 |
| 3,798,725 | A | * | 3/1974 | Hanson | 407/11 |
| 3,889,520 | A | * | 6/1975 | Stoferle et al. | 73/37.5 |
| 4,579,488 | A | * | 4/1986 | Griffin | 409/136 |
| 4,621,547 | A | * | 11/1986 | Yankoff | 82/1.11 |

(Continued)

FOREIGN PATENT DOCUMENTS

DE   81 26 791   3/1983

(Continued)

*Primary Examiner*—Boyer D Ashley
*Assistant Examiner*—Sara Addisu
(74) *Attorney, Agent, or Firm*—Drinker Biddle & Reath LLP

(57) ABSTRACT

A cutting tool for parting and grooving operations of the kind including a coupling part, which is intended for mounting the cutting tool in a machine tool, and a tool head detachably connected to the coupling part. The tool head includes a basic holder part and, joined to the basic holder part, a blade part, in front portion of which an insert pocket is formed, in which a cutting insert is fastenable. The cutting tool also includes means for supplying cooling agent to the cutting insert. The cooling agent supplying means includes a tube member, which is mounted in a recess, which is transverse to the longitudinal direction of the blade part and arranged in the tool head. The tube member has an inlet for connection to a cooling agent source and an outlet for leading the cooling agent in a direction towards the cutting insert.

20 Claims, 3 Drawing Sheets

U.S. PATENT DOCUMENTS

| | | | | |
|---|---|---|---|---|
| 4,695,208 | A | * | 9/1987 | Yankoff .................. 407/106 |
| 4,848,918 | A | * | 7/1989 | Kingsley et al. ........... 366/262 |
| 5,112,164 | A | * | 5/1992 | Pano ..................... 407/110 |
| 5,237,894 | A | * | 8/1993 | Lindeke .................. 82/1.11 |
| 5,272,945 | A | * | 12/1993 | Lockard .................. 82/1.11 |
| 5,340,242 | A | * | 8/1994 | Armbrust et al. ........... 407/11 |
| 5,346,335 | A | * | 9/1994 | Harpaz et al. .............. 407/11 |
| 5,439,327 | A | * | 8/1995 | Wertheim ................. 407/11 |
| 5,775,854 | A | * | 7/1998 | Wertheim ................. 407/11 |
| 5,833,403 | A | * | 11/1998 | Barazani ................. 407/101 |
| 6,045,300 | A | * | 4/2000 | Antoun ................... 407/11 |
| 6,186,704 | B1 | * | 2/2001 | Hale ..................... 407/101 |
| 6,270,294 | B1 | * | 8/2001 | Sjoo et al. ............... 407/101 |
| 6,299,388 | B1 | * | 10/2001 | Slabe ..................... 407/11 |
| 6,634,835 | B1 | | 10/2003 | Smith |
| 6,705,805 | B2 | * | 3/2004 | Lagerberg ................. 407/11 |
| 7,252,024 | B2 | * | 8/2007 | Zurecki et al. ............. 82/1.11 |
| 2005/0129471 | A1 | * | 6/2005 | Englund .................. 407/101 |
| 2007/0283794 | A1 | * | 12/2007 | Giannetti ................. 82/158 |
| 2008/0124180 | A1 | * | 5/2008 | Breisch .................. 407/110 |
| 2008/0131215 | A1 | * | 6/2008 | Sjoo ..................... 407/110 |
| 2009/0035075 | A1 | * | 2/2009 | Hecht et al. .............. 407/104 |

FOREIGN PATENT DOCUMENTS

| | | |
|---|---|---|
| DE | 34 34 653 | 4/1985 |
| EP | 0 636 442 | 2/1995 |
| EP | 1524053 A2 * | 4/2005 |

* cited by examiner

CUTTING TOOL AND ASSOCIATED TOOL HEAD

FIELD OF THE INVENTION

The present invention is related to a cutting tool for parting and grooving operations of the kind comprising a coupling part, which is intended for mounting the cutting tool in a machine tool, and a tool head detachably connected to the coupling part, the tool head comprising a basic holder part and, joined to the basic holder part, a blade part, in the front portion of which an insert pocket is formed, in which a cutting insert is fastenable, the cutting tool also comprising means for supplying cooling agent to the cutting insert.

BACKGROUND OF THE INVENTION AND PRIOR ART

For tools of the above-mentioned kind, during the machining operation there is supplied, for various reasons, some form of cooling agent to the cutting insert(s) in engagement with the workpiece. The cooling agent may whenever applicable consist of cooling liquid, cooling gas, or a liquid/gas mixture. For instance, in some cases cooling liquid is supplied in order to cool the cutting inserts as well as the workpiece and in other cases air together with misty oil are supplied in order to achieve lubrication and certain cooling. Fundamental for the cooling agent, which may also have lubricating properties, as already mentioned, is the object of giving the machined surfaces of the workpiece optimal characteristics, to cool the cutting inserts and the workpiece, and to obstruct adherence of the machined material to the tool. Another object of the cooling agent is to remove the chips being removed from the workpiece by the tool.

In cutting tools of the kind mentioned, it is known to arrange nozzles, for spraying cooling agent towards cutting inserts included in the tool, in such a way that the cooling liquid is sprayed onto the cutting insert from the side and from above, i.e. obliquely from above. Thus, the nozzles are usually arranged on the coupling part of the tool. In grooving operations and parting operations, when a very narrow cutting edge penetrates deeply into the workpiece, such known cutting tools often achieve an unsatisfactory supply of cooling agent to the cutting insert. In some cases this is due to the workpiece getting in the way of the jet of cooling agent from the nozzle towards the cutting insert. For obviating this problem it has also been tried, in other known cutting tools, to arrange the nozzles on the tool, so that the cooling agent is sprayed onto the cutting insert from above, but also substantially straight from behind. A drawback of this solution is that the cooling agent, before hitting the cutting insert, hits the chips being removed by the cutting insert, so that a major part of the cooling agent jet is deflected and, thus, an unsatisfactory supply of cooling agent to the cutting insert is achieved.

SUMMARY OF THE INVENTION

Thus, the basic object of this invention is to provide a cutting tool of the above-mentioned kind, which, in relation to prior known cutting tools of the kind in question, has improved characteristics as regards supply of cooling agent to the cutting insert included in the tool.

According to the invention this object is achieved by means of the features mentioned in the characterizing part of claim 1. Advantageous embodiments of the tool according to the invention are further defined in the dependent claims 2-9.

In another aspect, the invention is related to a tool head for a cutting tool for parting and grooving operations, which is detachably connectable to a coupling part of the cutting tool and which has a blade part, in the front portion of which an insert pocket is formed, in which a cutting insert is fastenable. The features of this tool head appear from claim 10.

BRIEF DESCRIPTION OF THE DRAWINGS

Below follows a detailed description of embodiments of the present invention cited as examples with reference to the appended drawings, wherein.

DETAILED DESCRIPTION OF PREFERRED EMBODIMENTS OF THE INVENTION

Figure 1:
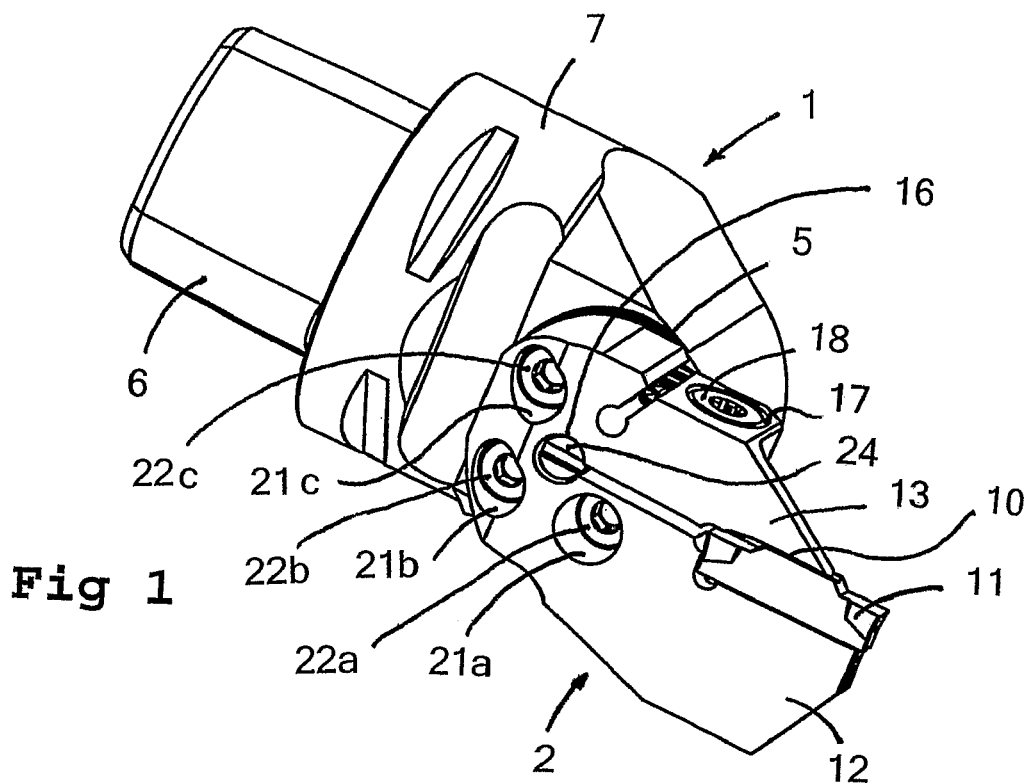
FIG. 1 is a perspective view of a cutting tool for parting and grooving operations according to a first preferred embodiment of the invention, which include a coupling part and a tool head detachably connected to each other.
Figure 2:
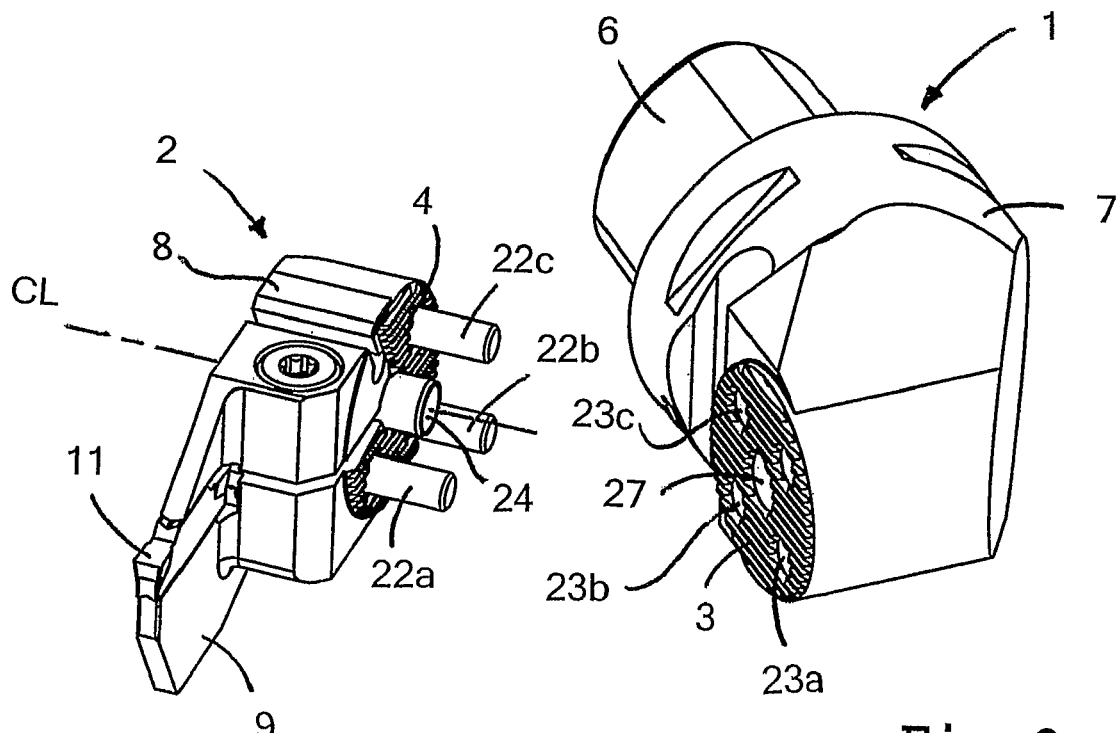
FIG. 2 is a perspective exploded view showing the tool head separated from the coupling part.

FIGS. 1 and 2 illustrate a tool for cutting or chip removing metal machining, more exactly a cutting tool for turning operations in form of parting operations and grooving operations. The cutting tool comprises a coupling part 1, which is detachably connected or interconnectable to a tool head 2. In the shown embodiment the parts 1,2 are connectable with each other via serration surfaces 3, 4. Thus, the coupling part 1 has a first serration surface 3 and the tool head 2 has a second serration surface 4. When these surfaces 3, 4 are brought into engagement with each other, they are part of an interface, designated 5, between the parts 1 and 2. The cutting tool is intended to, with the coupling part 1 thereof, be mounted in a machine tool (not shown), for instance a multi operation lathe. For this purpose, the coupling part is provided with a rear coupling piece 6, which is joined to a larger front body 6.

The tool head 2 is formed in one piece with a relatively thick basic holder part 8 and a thinner blade part 9 joined thereto. Preferably, the basic holder part 8 has a considerably larger width than the blade part 9. For instance, the basic holder part may be at least four times (4 times) wider than the blade part. Expressed in absolute numbers, the blade part may have a width of 3 mm and the basic holder part may be 13 mm wide. This is of course only to be considered as an illustrative example. Accordingly, many different dimensions of the tool head are applied in practice, suitably, but not necessarily, while maintaining the preferred mutual width relation. In the front portion of the blade part 9, there is arranged an insert pocket 10 in form of a clamping slot, in which a usually thin, replaceable cutting insert 11 is fastenable.

Figure 3:
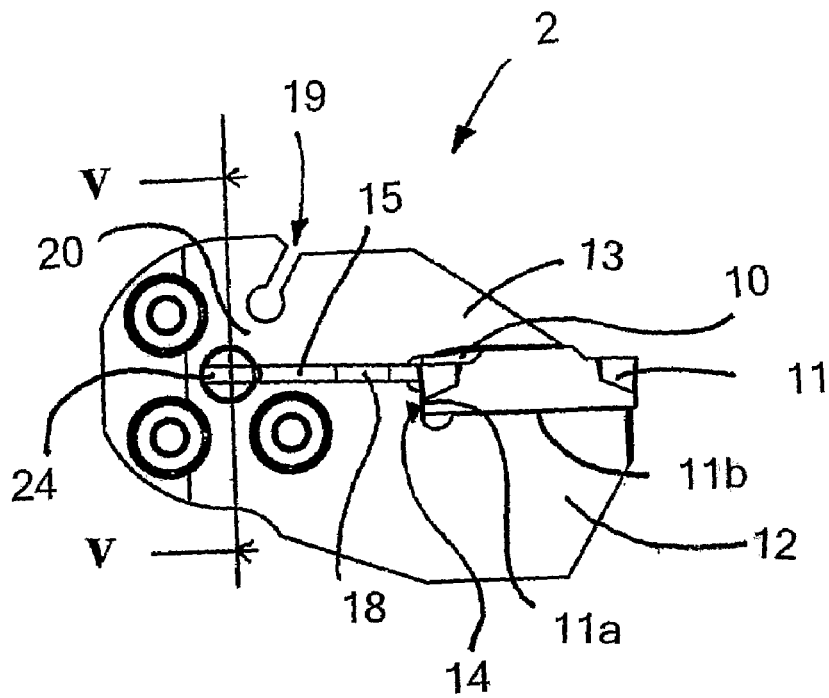
FIG. 3 is a side view of the tool head illustrated in FIG. 1 and FIG. 2.
Figure 4:
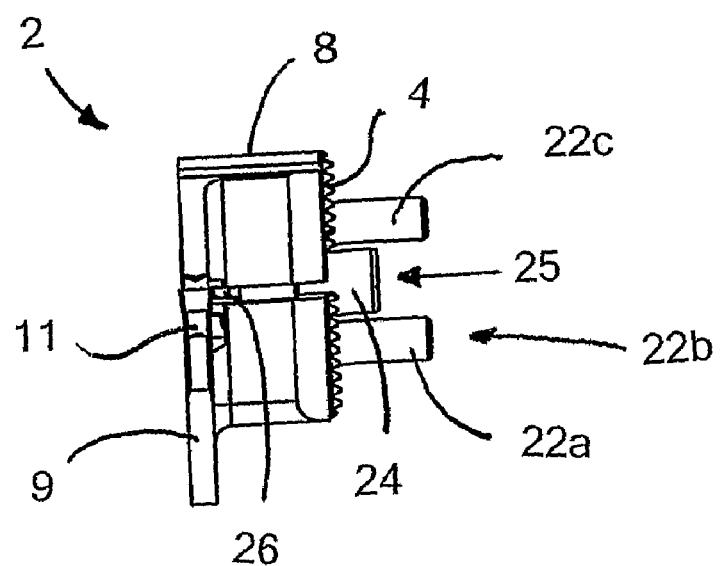
FIG. 4 is an end view of the tool head according to FIG. 1-3.
Figure 5:
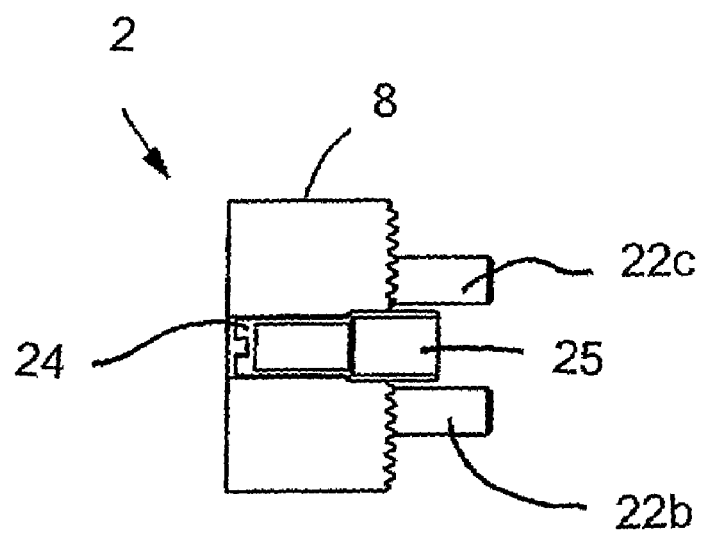
FIG. 5 is a section view according to V-V in FIG. 3.

Reference is now made also to FIG. 3-5, which in more detail illustrate the nature of the tool head 2. The insert pocket 10 is formed in the blade part 9 between a lower support part 12, carrying the insert 11, and an upper clamping portion 13 formed integrally in one piece with the support part. The insert 11 is intended to, with the rear end surface 11a thereof, abut against a stop shoulder 14, which restricts the axial inward displacement of the insert. The stop shoulder 14 is formed protruding on the lower support part 12 of the blade part 9 protruding from the basic holder part 8. The insert pocket 10 transforms backwards into a slot extension 15, extending in the longitudinal direction of the blade part 9, which slot extension has a considerably lower slot height than the insert pocket 10. As most clearly apparent from FIG. 2 and FIG. 4, the slot extension extends right through the entire basic holder part 8. The ending of the slot extension 15 consists of a substantially cylindrical recess, designated 16, in the basic holder part 8 of the tool head 2. The recess 16, in form of a through hole in the shown example, is arranged transversely, preferably perpendicularly, to the longitudinal extension of the blade part 9. Furthermore, the lower surface 11b of the insert is, preferably, oriented in a direction perpendicular to the rear part 11a of the insert and with said lower surface 11b parallel to the intended direction of feed. The mid part of the upper surface and lower surface 11b of the insert have, preferably, been provided with concave V-shaped wedge grooves in the manner shown and described in the Swedish patent application 9703434-2.

The basic holder part 8 is formed with a transverse slot 19 separate from the insert pocket 10, which slot extends right through the entire basic holder part 8. The slot 19 extends radially inwards to a position at a distance from the recess 16, so that a hinge 20 is formed therebetween. Suitably, the slot 19 has a longitudinal extension in a direction forming an angle of 35-90° in relation to the longitudinal extension of the insert pocket, for obtaining an optimal moment arm in relation to the hinge 20. Furthermore, in the basic holder part there is arranged a cylindrical hole 17, which is oriented perpendicularly to the longitudinal extension of the insert pocket 10, i.e. the hole runs in the vertical direction of the basic holder part. In the hole 17, which runs through the two parts of the basic holder part separated by the slot 15, i.e. the lower and the upper part, a tightening screw 18 is intended to be received. The lower part of the hole 17, i.e. the part of the hole located below the slot 15, is provided with an internal thread, which the threaded lower part of the tightening screw is intended to engage. Upon tightening of the tightening screw 18 received in the cavity 17 in the basic holder part 8, such a deflection downwards of the upper portion of the basic holder part about the hinge 20 is achieved, that the upper clamping portion 13 of the blade part 9 gets into clamping surface contact with the upper side of the insert 11, so that the insert 11 is clamped in the insert pocket 10.

The basic holder part 8 is provided with a plurality of cylindrical holes 21a, 21b, 21c being separate from each other, which extend in a transverse direction, in a direction parallel with the centre axis CL of the basic holder part, the centre axis thus being oriented perpendicularly to the longitudinal extension of the blade part 9. When interconnecting the tool head 2 and the coupling part 1, the parts 1,2 are secured to each other by three tightening screws 22a, 22b, 22c received in the holes 21a, 21b, 21c in the tool head 2 engaging corresponding holes 23a, 23b, 23c in the coupling part 1, while the serration surfaces 3, 4 engaging each other. The three tightening screws 22a, 22b, 22c together with the serration interface 5 serve the purpose of preventing rotation of the parts 1, 2 in relation to each other.

Figure 6:
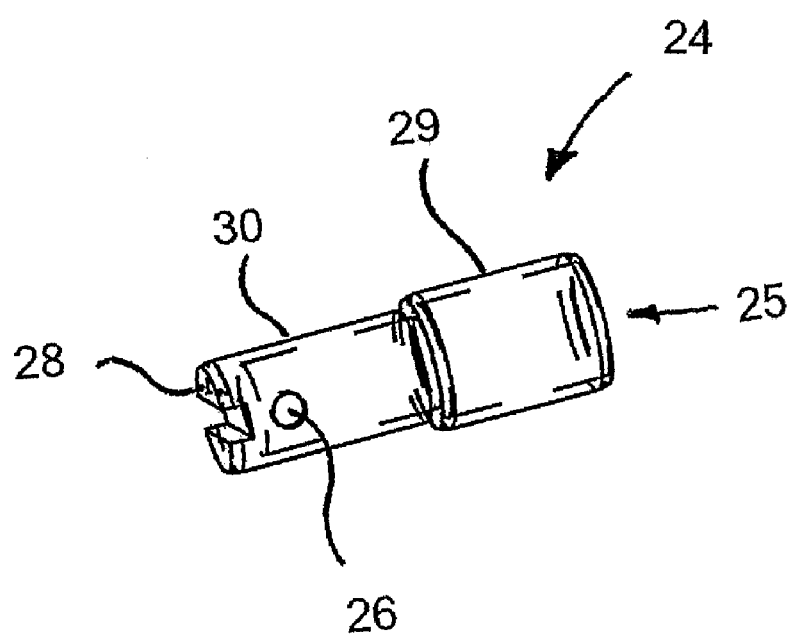
FIG. 6 is a perspective view of a tube member, included the cutting tool, for supplying cooling agent to a cutting insert fastened in the cutting tool.

Characterizing for the present invention is that, in a recess transverse to the longitudinal extension of the blade part 9, the recess 16 in the illustrated example, there is arranged a tube member 24, which is separately illustrated in FIG. 6, for spraying cooling agent towards the insert 11. Cooling agent is fed from a source, usually located at the machine tool (not shown), in which the coupling piece 6 is mounted, further through channels in the interior of the coupling part 1 on to the tube member 24. The tube member 24 has an inlet 25 for connection to a cooling agent source. In the embodiment shown, the tube member 24 is non-detachably mounted, for instance glued, in the recess 16. Furthermore, the tube member is adapted to, with a part of the total longitudinal extension thereof, be received in the recess 16 of the tool head. Accordingly, the other part of the tube member protrudes from the recess 16 on the side of the tool head 2 of the basic holder part 8 being provided with a serration surface 4. When interconnecting the tool head 2 and the coupling part 1, the tube member is adapted to be received by a cylindrical recess 27 in the coupling part. Thus, the tool head 2 may easily be fitted together with the coupling part, without the tightening screws 22a, 22b, 22c being inserted in their corresponding holes 21a, 21b, 21c, the protruding part of the tube member 24 constituting a guiding element, which is fitted into the recess 27 in the coupling part. Consequently, when interconnecting the parts 1, 2 the inlet 25 of the tube member is simultaneously connected to the channels, in the interior of the coupling part 1, feeding cooling agent from the cooling agent source.

Furthermore, the tube member 24 has an outlet 26 for leading the cooling agent in a direction towards the cutting insert 11. The outlet 26 is formed for directing, with good precision, the cooling agent towards the insert 11 and, in the shown embodiment, consists of a cylindrical opening in the envelope surface of the tube member, the opening being situated in the vicinity of the end 28 being situated opposite of the inlet 25 provided end of the tube member 24. The diameter of the outlet is considerably smaller than the diameter of the inlet. Furthermore, the end 28 of the tube member is closed by an end surface. Accordingly, no cooling agent can pass out through the end 28, but only through the outlet 26. As best appears from FIG. 4, the outlet 26 is arranged on substantially the same level vertically as the insert 11 in the insert pocket 10. The cooling agent may easily flow further from the outlet 26 of the tube member through the leading channel constituted by the slot extension 15 to the insert 11. Hereby, an utterly precise supply of cooling agent to the insert 11 during machining is achieved. Thus, the cooling agent is supplied to the insert 11 right from the behind and on the same height as the insert, which obviates the problem of the chips, being removed by the insert, deflecting the jet of cooling agent. Furthermore, the cooling agent thus reaches the insert, without the workpiece getting in the way of the jet of cooling agent from the outlet/nozzle 26. A good supply of cooling agent to the insert is achieved in this way, independent of how deep the grooving depth is, i.e. how deep the groove produced by the insert in the workpiece is.

Another advantage achieved with the cutting tool according to the invention is that the tube member, when mounted in the tool head, stiffens the tool head 2. This is a particular advantage in that case when, as illustrated in FIG. 1-5, the tool head 2 for fastening the insert 11 in the insert pocket 10 is provided with a tightening screw 18, a slot extension 15, a slot 19 and a hinge 20. Upon tightening of the tightening screw 18, the tool head 2 tends to rotate somewhat, which may cause a tilting of the insert in the insert pocket due to a certain displacement of the upper clamping portion 13 of the blade part 9 in the transverse direction of the tool head, i.e. in the direction of the centre axis CL. This rotation tendency, upon tightening of the tightening screw 18, is decreased or completely eliminated by the tube member 24 inserted into the recess 16. Preferably, the tube member 24 has substantially cylindrical basic shape. As best appears from FIG. 6, the tube member further has two sections 29, 30 in the longitudinal direction having different diameters. The section 29, in which the inlet 25 is arranged and which is adapted to be received both in the recess 16 of the tool head 2 and in the recess 27 of the coupling part 1, has a larger diameter than the section 30, which is provided with the outlet 26. The outer diameter of the section 29 substantially corresponds to the inner diameter of the recess 16 and the inner diameter of the recess 27. Thus, a certain play is present between the section 30 of the tube member and the recess 16. By suitable choice of length of the section 29, the stiffening of the basic holder part of the tool head, for counter-acting rotation thereof, as a consequence of tightening of the tightening screw 18, may be controlled.

The invention is of course not in any way limited to the embodiments described above, but many possibilities of modifications thereof would be obvious for a person with ordinary skill in the art, without departing from the invention, such as this is defined in the appended claims.

In the embodiments described above, the tool head 2 is provided with a tightening screw 18, a slot extension 15, a slot 19 and a hinge 20 for fastening the insert 11 in the insert pocket 10. However, within the scope of the present invention, many different designs of the tool head are conceivable, for instance where such tightening screw, slot extension, slot and hinge are omitted. For instance, in such cases the cutting insert may be retained in the insert pocket by the insert pocket having somewhat smaller dimensions vertically than the insert before the insert is inserted, so that the insert carrying lower support part and the upper clamping portion of the blade part, upon insertion of the insert into the insert pocket, deflect elastically outwards somewhat and, thereby, are imparted a prestress clamping the insert therebetween.

In the embodiments described above, the tube member 24 and the recesses 16, 27 for receiving the tube member are formed with a circular cross section. Within the scope of the present invention, other designs of the tube member and the recesses for receipt thereof are of course conceivable, such as for instance having rectangular or triangular cross section.

The invention claimed is:

1. A cutting tool for parting and grooving operations, comprising:
    a coupling part, which is intended for mounting the cutting tool in a machine tool, and
    a tool head detachably connected to the coupling part, the tool head comprising:
        a basic holder part, and
        a blade part, the blade part including two opposing planar surfaces that are separated by a depth that is shorter than the length and width dimensions of the two opposing planar surfaces, and wherein the depth of the blade part is horizontally transverse to a longitudinal direction of the blade part,
    wherein in a front portion of the blade part, an insert pocket is formed, in which a cutting insert is fastenable, and in a back portion, which is opposite in the longitudinal direction from the front portion, the blade part is joined to the basic holder part,
    wherein the cutting tool includes means for supplying cooling agent to the cutting insert, and
    wherein said cooling agent supplying means includes a tube member, which is mounted in a recess, which is horizontally transverse to the longitudinal direction of the blade part and arranged in the tool head, the tube member having an inlet for connection to a cooling agent source and an outlet for leading the cooling agent in a direction towards the cutting insert.

2. A cutting tool according to claim 1, wherein the basic holder part and the blade part are formed in one piece, the basic holder part having considerably larger depth than the blade part.

3. A cutting tool according to claim 1, wherein the transverse recess, in which said tube member is mounted, is arranged in the basic holder part of the tool head.

4. A cutting tool according to claim 1, wherein the tube member receiving recess in the tool head has a longitudinal extension substantially perpendicular to the longitudinal extension of the blade part.

5. A cutting tool according to claim 1, wherein the tube member receiving recess in the tool head is a through hole.

6. A cutting tool according to claim 1, wherein the outlet of the tube member is arranged at substantially the same level vertically as the cutting insert in the insert pocket.

7. A cutting tool according to claim 1, wherein the tube member has a substantially cylindrical basic shape and has at least two sections with different diameters.

8. A cutting tool according to claim 1, wherein there is provided, in the tool head, a leading channel for cooling agent from the recess of the tool head to the insert pocket.

9. A cutting tool according to claim 1, wherein the coupling part has a recess for receiving a part of said tube member, and that the tube member is adapted to be received partly in the recess of the tool head and partly in the recess of the coupling part, when the coupling part and the tool head are connected with each other.

10. A tool head for a cutting tool for parting and grooving operations, which is detachably connectable to a coupling part of the cutting tool and which has a blade part, the blade part including two opposing planar surfaces that are separated by a depth that is shorter than the length and width dimensions of the two opposing planar surfaces, and wherein the depth of the blade part is horizontally transverse to a longitudinal direction of the blade part,
    wherein in a front portion of the blade part, an insert pocket is formed, in which a cutting insert is fastenable, and in a back portion, which is opposite in the longitudinal direction from the front portion, the blade part is joined to the basic holder part, and
    wherein the tool head has a recess horizontally transverse to the longitudinal direction of the blade part, in which recess a tube member is mounted, the tube member having an inlet for connection to a cooling agent source and an outlet for leading the cooling agent in a direction towards the cutting insert.

11. A tool head according to claim 10, further comprising a basic holder part joined to the blade part of the tool head.

12. A tool head according to claim 11, wherein the basic holder part and the blade part are formed in one piece, the basic holder part having considerably larger depth than the blade part.

13. A tool head according to claim 11, wherein the transverse recess, in which said tube member is mounted, is arranged in the basic holder part of the tool head.

14. A tool head according to claim 10, wherein the tube member receiving recess in the tool head has a longitudinal extension substantially perpendicular to the longitudinal extension of the blade part.

15. A tool head according to claim 10, wherein the tube member receiving recess in the tool head is a through hole.

16. A tool head according to claim 10, wherein the outlet of the tube member is arranged at substantially the same level vertically as the cutting insert in the insert pocket.

17. A tool head according to claim 10, wherein the tube member has a substantially cylindrical basic shape and has at least two sections with different diameters.

18. A tool head according to claim 10, wherein there is provided, in the tool head, a leading channel for cooling agent from the recess of the tool head to the insert pocket.

19. A cutting tool for parting and grooving operations, comprising:
- a coupling part, which is intended for mounting the cutting tool in a machine tool, and
- a tool head detachably connected to the coupling part, the tool head comprising:
  - a basic holder part, and
  - a blade part, the blade part including two opposing planar surfaces that are separated by a depth that is shorter than the length and width dimensions of the two opposing planar surfaces, and wherein the depth of the blade part is transverse to a longitudinal direction of the blade part,
- wherein in a front portion of the blade part, an insert pocket is formed, in which a cutting insert is fastenable, and in a back portion, which is opposite in the longitudinal direction from the front portion, the blade part is joined to the basic holder part,
- wherein the cutting tool includes means for supplying cooling agent to the cutting insert, and
- wherein said cooling agent supplying means includes a tube member, which is mounted in a recess, which is transverse to the longitudinal direction of the blade part and arranged in the basic holder part of the tool head, the tube member having an inlet for connection to a cooling agent source and an outlet for leading the cooling agent in a direction towards the cutting insert.

20. A tool head for a cutting tool for parting and grooving operations, which is detachably connectable to a coupling part of the cutting tool and which has a blade part, the blade part including two opposing planar surfaces that are separated by a depth that is shorter than the length and width dimensions of the two opposing planar surfaces, and wherein the depth of the blade part is transverse to a longitudinal direction of the blade part, wherein in a front portion of the blade part, an insert pocket is formed, in which a cutting insert is fastenable, and in a back portion, which is opposite in the longitudinal direction from the front portion, the blade part is joined to the basic holder part,
- wherein the tool head has a recess transverse to the longitudinal direction of the blade part, in which recess a tube member is mounted, the tube member having an inlet for connection to a cooling agent source and an outlet for leading the cooling agent in a direction towards the cutting insert, and
- wherein the outlet of the tube member is arranged at substantially the same level vertically as the cutting insert in the insert pocket.

* * * * *